United States Patent [19]

Cody et al.

[11] Patent Number: 4,900,707

[45] Date of Patent: Feb. 13, 1990

[54] METHOD FOR PRODUCING A WAX ISOMERIZATION CATALYST

[75] Inventors: Ian A. Cody, Clearwater, Canada; Glen P. Hamner, deceased, late of Baton Rouge, La., by Nita A. M. Hamner, executrix; Willard H. Sawyer; James J. Schorfheide, both of Baton Rouge, La.

[73] Assignee: Exxon Research and Engineering Company, Florham Park, N.J.

[21] Appl. No.: 283,658

[22] Filed: Dec. 13, 1988

Related U.S. Application Data

[63] Continuation-in-part of Ser. No. 134,698, Dec. 18, 1987, abandoned.

[51] Int. Cl.$^4$ .................. B01J 27/12; B01J 27/13
[52] U.S. Cl. ..................... 502/230; 502/224; 502/229
[58] Field of Search ................ 502/224, 229, 230

[56] References Cited

U.S. PATENT DOCUMENTS

| | | | |
|---|---|---|---|
| 2,668,790 | 2/1954 | Good et al. | 196/50 |
| 2,668,866 | 2/1954 | Good et al. | 260/683.5 |
| 2,817,693 | 12/1957 | Koome et al. | 260/683.5 |
| 2,838,444 | 6/1958 | Teter et al. | 196/50 |
| 3,078,323 | 2/1963 | Kline et al. | 260/683.65 |
| 3,121,696 | 2/1964 | Hoekstra | 252/441 |
| 3,123,573 | 3/1964 | Carr | 502/230 |
| 3,125,511 | 3/1964 | Tupman et al. | 208/264 |
| 3,206,525 | 9/1965 | Michaels et al. | 260/683.66 |
| 3,268,439 | 8/1966 | Tupman et al. | 208/112 |
| 3,308,052 | 3/1967 | Ireland et al. | 208/27 |
| 3,365,390 | 1/1968 | Egan et al. | 208/60 |
| 3,629,096 | 12/1971 | Divijah | 208/89 |
| 3,684,695 | 8/1972 | Neil et al. | 206/110 |
| 3,709,817 | 1/1973 | Suggitt et al. | 208/112 |
| 3,711,399 | 1/1973 | Estes et al. | 208/112 |
| 3,717,586 | 2/1973 | Suggett et al. | 252/439 |
| 3,794,580 | 2/1974 | Ladeur | 208/110 |
| 3,830,723 | 8/1974 | Ladeur et al. | 208/108 |
| 3,864,425 | 2/1975 | Gardner | 260/683.68 |
| 3,915,843 | 10/1975 | Franck et al. | 208/112 |
| 4,025,459 | 5/1977 | Wristers | 502/230 X |
| 4,032,474 | 6/1977 | Goudriaan et al. | 502/230 X |
| 4,186,078 | 1/1980 | Itoh et al. | 208/27 |
| 4,263,127 | 4/1981 | Rausch et al. | 208/58 |
| 4,444,895 | 4/1984 | Fung et al. | 502/37 |
| 4,472,529 | 9/1984 | Johnson et al. | 502/231 X |
| 4,695,365 | 9/1987 | Ackelson et al. | 208/89 |

FOREIGN PATENT DOCUMENTS

| | | |
|---|---|---|
| 0153782 | 9/1985 | European Pat. Off. |
| 823010 | 11/1959 | United Kingdom . |
| 848198 | 9/1960 | United Kingdom . |
| 1065205 | 4/1967 | United Kingdom . |
| 1342499 | 1/1974 | United Kingdom . |
| 1342500 | 1/1974 | United Kingdom . |
| 1440230 | 6/1976 | United Kingdom . |
| 1493928 | 11/1977 | United Kingdom . |

Primary Examiner—W. J. Shine
Attorney, Agent, or Firm—Joseph J. Allocca

[57] ABSTRACT

An improved wax isomerization catalyst is described which is a hydrogenation metal on halogenated refractory metal oxide support catalyst characterized in that the catalyst is prepared by depositing the hydrogenation metal on the refractory metal oxide support followed by fluoriding using a low pH fluorine source such as aqueous HF. Thereafter the catalyst is crushed to expose inner surfaces, the crushed catalyst being sieved to remove fines, the catalyst charge having an average particle diameter of 1/32 inch and smaller across the longest continuous cross sectional dimension, preferably between 1/64 to 1/32". Alternatively, the catalyst is made by depositing a hydrogenation metal on a refractory metal support, crushing the material to a particle size of 1/32 inch and smaller across the longest continuous cross-sectional dimension and fluoriding said material using acidic fluorine source such as HF. Following sizing the sized catalyst is activated by heating in a hydrogen atmosphere.

Isomerization using this "sized" catalyst is marked by the production of an isomerized dewaxed oil product having unexpectedly high VI and superior levels of selective conversion of wax to liquid isomerized product.

13 Claims, No Drawings

METHOD FOR PRODUCING A WAX ISOMERIZATION CATALYST

CROSS REFERENCE TO RELATED APPLICATIONS

This is a continuation-in-part application of U.S. Ser. No. 134,698, filed Dec. 18, 1987, which was based on conversations with Ian Cody and on Information and Belief.

DESCRIPTION OF THE INVENTION

An improved wax isomerization catalyst is prepared by the process involving the steps of depositing a hydrogenation metal component on a refractory metal oxide support followed by halogenation using an acidic halogen source such as HF. Following halogenation, the catalyst is crushed to expose inner surfaces of the prepared catalyst particles and sized to a particle size of 1/32 inch and smaller across its longest continuous cross-sectional dimension. Alternatively, a metal loaded material can be crushed to produce a material of small particle size, about 1/32 inch and smaller across the longest continuous cross sectional dimension, which is then fluorided using HF. The catalyst (hereinafter called "sized") produces superior yields of isomerized wax products, and lube oil fractions taken from the isomerate possess exceptionally high viscosity index (VI). When slack wax containing about 7% oil is isomerized, the resulting 370° C.+ oil product possesses an unexpectedly high VI, a VI higher than that obtained when one isomerizes wax with either no oil in it or with about 20% oil. Thus, an isomerization process using the meshed catalyst is preferably run on a wax feed containing about 5 to 15 wt. % oil, more preferably about 7 to 10 wt. % oil in the wax.

The sized catalyst is prepared by depositing a hydrogenation metal such as Group VIII metal (e.g. platinum) on a refractory metal oxide support. The refractory oxide metal support is in the form of a particle or extrudate and is alumina, or material containing alumina, preferably predominantly (i.e. >50%) alumina, most preferably an alumina such as gamma or eta alumina extrudates.

The hydrogenation metal is deposited on the support by any convenient method such as soaking, spraying, incipient wetness, solution exchange, etc. followed by drying at 120°–150° C. and calcination at L- 350°–500° C., preferably 450°–500° C. for from 1–5 hours. Suitable sources of hydrogenation metal include chloroplatinic acid and fluoroplatinic acid. Metal loading is about 0.1 to 5.0 wt % metal, preferably 0.1 to 1.0 wt % metal, most preferably 0.2 to 0.6 wt % metal.

Following metal deposition, drying and calcination the catalyst is fluorided using HF solution, water washed to remove excess HF, followed by drying.

The catalyst is contacted with the fluoriding solution by any convenient method such as soaking, spraying, incipient wetness, etc. Whatever technique is used should be employed so as to obtain between 2 to 10% fluorine, into the catalyst, preferably 2–8% fluorine.

As previously stated, the catalyst of the present invention is a sized material. The particle or extrudate with which one begins following deposition of the hydrogenation metal and the fluorine is sized to expose inner surfaces of the particle or extrudate. The starting particle or extrudate may be of any physical configuration. Thus, particles such as trilobes or quadrilobes may be used. Extrudates of any size may be utilized, and can be anywhere from 1/32 to ¼ of an inch measured across the longest cross-sectional dimension.

Following deposition of the hydrogenation metal and the halogenation of the particle or extrudate, the particle or extrudate is crushed or fractured to expose inner surfaces. Alternatively, the metal loaded support can be crushed or fractured, sized, then fluorided using HF as described above.

In either case the crushing is conducted to an extent appropriate to the particle or extrudate with which one is starting such as 1/32 to ¼ inch extrudates of 1/16 to ½ inch in length. If the extrudate is only 1/16 inch in maximum cross-section to begin with, it will be enough simply to fracture it. The crushed material is sieved to remove fines and any uncrushed particles. This sieved catalyst will typically be at least a 14/35 mesh (Tyler).

Generally, therefore, the sized material will be 1/32 inch and smaller across the longest continuous cross sectional dimension and preferably range in size between about 1/64 to 1/32 inch across its longest continuous cross-sectional dimension (i.e. in maximum crosssection), the proviso being that the upper limit is smaller than the cross-section of the starting particle or extrudate.

The sized, fluorided catalyst is activated before use by heating in a hydrogen atmosphere (e.g. pure or plant hydrogen (i.e. 60 to 70 vol % $H_2$)) to from 350° C. to 500° C. for from 1–48 hours or longer.

A typical hydrogen activation profile may be a period of 2 hours to go from room temperature to 100° C. with the catalyst being held at 100° C. from 0 to 2 hours, then the temperature is raised from 100 to about 350° C. to 500° C., preferably 350 to 450° C. over a period of 1 to 3 hours with a hold at the final temperature of from 1 to 4 hours. Alternatively, the catalyst can be hydrogen activated by heating from room temperature to the final temperature of 350 to 500° C. preferably 350 to 450° C. over a period of 2 to 7 hours with a hold at the final temperature of 0 to 4 hours. Similarly, hydrogen activation can be accomplished by going from room temperature to the final temperature of 350° to 500° C. preferably 350° to 450° C. in 1 hour.

In small pilot units, sizing down of particles is practiced to improve catalyst-liquid feed contacting and minimize back mixing of partially converted product and feed. Particle sizing can lead to improved catalyst performance because of improved hydrodynamics especially if the system is A→B→C where B (in this case oil) is the desired product. However, in this case it has been found that the improvement caused by sizing the particles exceeds the benefits normally associated simply from better contacting (see Example 1, Catalyst 1 and Catalyst 4). We have the benefit of high mass velocity operation (2000 lb/ft²/h) data to establish performance at plant scale (i.e., no hydrodynamic limitations) using unsized particles. Small scale operation (approximately 100 lb/ft²/h) using sized particles gives higher yields than is achieved at plant scale mass velocities using the unsized particles.

This sized catalyst is unexpectedly superior for wax isomerization as compared to the uncrushed particle or extrudate starting material producing higher yields of oil boiling in the 370° C.+ range. It has also been discovered that 370° C.+ oil products made using the meshed catalyst starting with a wax feed possessing about 5–10% oil exhibit higher VI's than do 370° C.+ oil products made starting with wax possessing either 0% oil or about 20% oil. Therefore, to make products having the highest VI, one would isomerize wax having from 5-15% oil, preferably 7-10% oil.

The wax which may be isomerized using this meshed catalyst is any readily available natural wax. Natural waxes include those waxes obtained by dewaxing natural hydrocarbons, commonly called slack waxes. Slack waxes contain anywhere from 0 to 45% oil or more depending on the molecular weight of the oil being dewaxed to a specific pour point. For the purposes of this invention, it is preferred that when slack wax is used as the isomerization feed, it will contain from about 1 to 35 wt. % oil, preferably about 1-25 wt. % oil, more preferably 5-15 wt. % oil, most preferably 7-10 wt. % oil.

Slack waxes, coming from natural petroleum sources, contain numerous molecular species such as heteroatom compounds and polynuclear aromatic materials which are detrimental to the life and activity of isomerization catalysts. Thus, the heteroatoms should be removed prior to isomerization using a hydrotreating catalyst under mild hydrotreating conditions Exemplary of hydrotreating catalysts are Ni/Mo on alumina, Co/Mo on alumina. Hydrotreating conditions are 250°-400° C.; 0.1-10 LHSV; 500 to 3000 psi $H_2$; 500-2000 SCF $H_2$/bb1. Following hydrotreating acceptable levels will be a nitrogen content of about 1-5 ppm, preferably 2 ppm and less and a sulfur content of about 1-20 ppm, preferably 5 ppm and less.

Isomerization over the meshed catalyst is conducted at a temperature of 300°-400° C., 500 to 3000 psi $H_2$; 1000-10,000 SCF/bbl, $H_2$, and 0.1-10.0 LHSV, preferably 320°-385° C., 1000-1500 psi $H_2$, and 1-2 V/V/hr.

An integrated process to produce lube base stock oils or blending stocks by isomerizing waxes is disclosed in copending application U.S. Ser. No. 283,664, filed even date herewith, which is a continuation-in-part of Ser. No. 135,150, filed Dec. 18, 1987 in the names of Cody, Achia, Bell, West and Wachter. The use of the present catalyst in a wax isomerization process is disclosed and claimed in copending application U.S. Ser. No. 283,680, filed even date herewith, which is a continuation-in-part of U.S. Ser. No. 134,697, filed Dec. 18, 1987 in the names of Cody, Hamner, Achia and Wachter.

The desired conversion of wax to a finished grade lube oil is dictated by 2 factors: (1) the ability of the dewaxing unit to process the unconverted wax remaining in the isomerate and (2) and maximum production of dewaxed oil boiling in the lube oil range, e.g. about 330° C.+, preferably 370° C.+; thus high levels of conversion to non lube boiling range products are undesirable. Consequently, a balance must be struck between low conversions (favoring lubes production but sending too much residual wax to the dewaxer) and high conversion (sending low levels of wax to the dewaxer but producing fuels at the expense of lubes).

As is taught in copending application U.S. Ser. No. 283,664, the level of conversion which strikes the balance between these competing interests is that which leaves ~40% and less, preferably 15-35%, most preferably 20-30% unconverted wax in the fraction of the isomerate boiling in the desired lube boiling range sent to the dewaxer. At such levels of conversion, the most efficient utilization of the wax feed is made considering that unconverted wax recovered in the dewaxer is recycled to the isomerization unit.

Following isomerization the isomerate is fractionated into a lubes cut and fuels cut, the lubes cut being identified as that fraction boiling in the 30° C.+ range, preferably the 370° C.+ range or even higher. The lubes fraction is then dewaxed to a pour point of about −21° C. or lower. Dewaxing is accomplished by techniques which permit the recovery of unconverted wax, since in the process of the present invention this unconverted wax is recycled to the isomerization unit. It is preferred that this recycle wax after the removal of the solvent used in the dewaxing operation be recycled to the isomerization reactor. A separate stripper can be used to remove entrained dewaxing solvent or other contaminants.

Solvent dewaxing utilizes typical dewaxing solvents such as $C_3$-$C_6$ ketones (e.g. methyl ethyl ketone, methyl isobutylketone and mixtures thereof), $C_6$-$C_{10}$ aromatic hydrocarbons (e.g. toluene) mixtures of ketones and aromatics (e.g. MEK/toluene), autorefrigerative solvents such as liquified, normally gaseous $C_2$-$C_4$ hydrocarbons such as propane, propylene, butane, butylene etc. at filter temperature of −25 to −30° C. It has been discovered that the preferred solvent to dewax the isomerate under miscible conditions and thereby produce the highest yield of dewaxed oil at a high filter rate is a mixture of MEK/MIBK (20/80 v/v) used at a temperature in the range of −25 to −30 C. Pour points lower than −21° C. can be achieved using lower filter temperatures and other ratios of said solvent. Further, when dewaxing isomerate made from a microwax, e.g. Bright Stock slack wax it has been found to be preferred that the fraction of the isomerate which is dewaxed is the "broad heart cut" identified as the fraction boiling between about 330°to 600° C., preferably 370°-600° C. When processing wax fractions higher than 1050° F.+ the heavy bottoms fraction contains appreciable unconverted wax so they can be recycled to the isomerization unit.

One desiring to maximize the production of lube oil having a viscosity in the 5.6 to 5.9 cSt/100° C. range should practice the isomerization process under low hydrogen treat gas rate conditions, treat gas rates on the order of 500 to 5000 SCF/bbl, $H_2$, preferably 2000 to 4000 SCF/bbl, $H_2$, most preferably about 2000 to 3000 SCF/bbl, $H_2$, as is taught in copending application U.S. Ser. No. 283,684, filed even date herewith, which is a continuation-inpart of U.S. Ser. No. 134,998, filed Dec. 18, 1987 in the name of H. A. Boucher.

It has also been found that prior to fractionation of the isomerate into various cuts and dewaxing said cuts, the total liquid product (TLP) from the isomerization unit can be advantageously treated in a second stage at mild conditions using the isomerization catalyst or a noble Group VIII on refractory metal oxide catalyst to reduce PNA and other contaminants in the isomerate and thus yield an oil of improved daylight stability. This aspect is covered in copending application U.S. Ser. No. filed even date herewith, which a continuation-inpart of U.S. Ser. No. 135,149, filed Dec. 18, 1987 in the names of Cody, MacDonald, Eadie and Hamner.

In that embodiment, the total liquid product is passed over a charge of the isomerization catalyst or over noble Group VIII on e.g. gamma alumina catalyst under mild conditions, e.g. a temperature in the range of about 170°-270° C., preferably about 180° to 220° C. at a pressure of about 300-1500 psi H2, preferably about 500 to 1000 psi H2, a hydrogen gas rate of about 500 to 10,000 SCF/bbl, preferably 1000 to 5000 SCF/bbl and a flow velocity of about 0.25 to 10 V/V/hr., preferably about 1-4 V/V/hr.

The total liquid product can be treated under these mild conditions in a separate, dedicated unit or the TLP from the isomerization reactor can be stored in tankage and subsequently passed through the isomerization reactor under said mild conditions. It has been found to be unnecessary to fractionate the total liquid product prior to this mild second stage treatment. Subjecting the whole TLP to this mild second stage treatment produces an oil product which upon subsequent fractionation and dewaxing yields a base oil exhibiting a high level of daylight stability and oxidation stability.

EXAMPLE 1

In the following runs the isomerate was made from slack wax obtained by solvent dewaxing a 600 N oil. The slack wax was hydrotreated over HDN-30 catalyst at 350° C., 1.0 v/v/hr. 1500 SCF/bbl, $H_2$, 1000 psi $H_2$ or over KF-840 at 340° C., 0.5 v/v/hr., 1000 psi, 1500 SCF/bbl, $H_2$. These hydrotreated waxes had oil contents ranging from 21 to 23%, S ranging from 3 to 10 (ppm), N $\leq$ 1 (ppm).

This wax feed was contacted with platinum on fluorided alumina produced in the following way.

Catalyst 1 One sixteenth inch $\gamma$ alumina extrudates impregnated with platinum were obtained from the commercial supplier containing 0.6 wt. % platinum and 1% chlorine on the extrudate. The metal loaded extrudate was then fluorided using a 10 fold excess 11.6 wt % aqueous HF by immersion for 16 hrs. at ambient temperature. The resulting catalyst was washed with $H_2O$ and dried at 150° C. in vacuum for 16 hrs. The fluoride content was 8.0 wt. %. The sample of catalyst, as charged to the 200 cc unit was activated in 300 psi $H_2$ at 6.3 SCF $H_2$/hr per pound of catalyst as follows: heat from room temperature to 100° C. at 35° C/hr; hold at 100° C. for 6 hrs; heat from 100° C. to 250° C. at 10° C./hr; hold at 250° C. for 12 hrs; heat to 400° C. at 10° C./hr; hold at 400° C. for 3 hrs. The sample of catalyst 1 as charged to the 3600 cc unit was activated as follows: at 300 psi $H_2$ at 11 SCF $H_2$/hr per pound of catalyst, heat from room temperature to 100° C. at 10° C./hr, hold at 100° C. for 24 hrs; heat from 100° C. to 250° C. at 10° C. per hour; hold at 250° C. for 15 hours; then at 2 SCF $H_2$/hour per pound of catalyst, heat from 250° C. to 400° C. in 31 hours; hold at 400° C. for 3 hours.

Catalyst 2 One sixteenth inch commercial 0.6 wt % platinum on $\gamma$ alumina extrudates were fluorided using 11.6 wt % aqueous HF to a final fluoride level of 8.3 wt %. Catalyst dried at 150° C. The extrudate catalyst was then crushed and sized to a 14/35 mesh (about 1/30 inch). The catalyst was not calcined. The catalyst was activated in 50 psi flowing $H_2$ by heating from room temperature to 100° C. in 2 hours; heating to 450° C. in 3 hours with a final hold at 450° C. for 1 hour.

Catalyst 3 One sixteenth inch $\gamma$ alumina extrudates impregnated with platinum were obtained from a commercial supplier containing 0.6 wt % platinum and 1% chlorine. The metal loaded extrudate was fluorided using a solution of $NH_4F/HF$ at about pH 4 by soaking. The soaked material was washed, then dried/heated for 2 hours at 400° C. in air. Fluorine content was found to be 7.0 wt %, and the surface N/Al=0.0037 by X-ray photo electron spectroscopy. Catalyst 3 was activated in the 200 cc charge unit by heating in 50 psi flowing $H_2$ as follows: room temperature to 100° C. in 2 hrs., hold for 1 hr., 100° C. to 450° C. in 3 hrs., hold for 4 hrs. For the sample of catalyst 3 used in the unit containing the 80 cc charge reported in Table 2, final activation condition was 400° C. for 0.75 hours.

Catalyst 4 was prepared by meshing the dried/heated platinum in flouride $\gamma$ alumina extrudate prepared for Catalyst 3 to a particle size of 1/30" (14/35 mesh). After meshing to a particle size of 1/30" (14/35 mesh), Catalyst 4 was activated in hydrogen by heating from room temperature to 100° C. over a 2 hour period, hold at 100° C. for 1 hour, heating from 100 to 450° C. over a 3 hour period, holding at 450° C. for 1 hour. The activation pressure was 50 PSI in $H_2$.

Catalyst 5 1/16"$\gamma$ $Al_2O_3$ extrudates were impregnated with chloroplatinic acid to a level of 0.26% Pt. The extrudates were then sized and screened to 1/30" mesh and subsequently fluorided using a 10 fold excess of 11.6 wt % aqueous HF by immersion for 4 hrs at ambient temp. The resulting catalyst was washed in a 30 fold excess of $H_2O$ and dried at 130° C. for 16 hrs. The catalyst was not calcined. The fluorine content was found to be 8.5 wt %. The dried catalyst was activated by the procedure used for catalyst 2 above.

Table 1 presents comparisons of these 5 catalysts on slack wax from 600N oil. Conditions are recited under which the catalysts were run. Dewaxed oil yields were determined by using the test method ASTM D-3235 on the 370° C.+fraction.

This example demonstrates that catalyst 2 is unexpectedly superior to the extrudate form of the aqueous HF catalyst (catalyst 1) even when catalyst 1 is run at high mass velocity (run 1) where feed and catalyst contacting are excellent and back mixing is minimized. Therefore, the unexpectedly better performance of Catalyst 2 is not simply due to hydrodynamics.

The importance of the use of HF as the fluoriding media is also demonstrated, compare Catalyst 2 with Catalyst 4, when each catalyst was run in the small unit in the down flow mode. Clearly, sizing down the particles does not always improve selectivity; it is only an advantage if fluoriding was originally performed at low PH (e.g. <4) using for example HF. The performance of catalyst 5 of Table 1 also illustrates that the catalyst can be sized before fluoriding. Good selectivity again results when the low pH fluoriding media is used.

TABLE 1

| Catalyst | 1 | 2 | 2 | 2 | 3 | 3 | 4 | 5 |
|---|---|---|---|---|---|---|---|---|
| Unit* | (a) | (a) | (a) | (b) | (a) | (b) | (b) | (b) |
| Cat Charge (cc) | 3600 | 200 | 200 | 80 | 200 | 80 | 80 | 80 |
| Flow | Down | Up | Up | Down | Up | Up | Down | Down |
| Isomerization Conditions | | | | | | | | |
| Temp °C. | 323 | 318 | 347 | 320 | 340 | 320 | 310 | 320 |
| Pressure (psi $H_2$) | 1000 | 1000 | 1000 | 1000 | 1000 | 1000 | 1000 | 1000 |
| LHSV (v/v/h) | 1.0 | 1.0 | 0.9 | 0.9 | 0.9 | 0.9 | 0.9 | 0.9 |
| Gas rate (SCF $H_2$/bbl) | 5000 | 5000 | 5000 | 5000 | 5000 | 5000 | 5000 | 5000 |

TABLE 1-continued

| Catalyst | 1 | 2 | 2 | 3 | 3 | 4 | 5 |
|---|---|---|---|---|---|---|---|
| Unit* | (a) | (a) | (a) | (b) | (a) | (b) | (b) | (b) |
| Dewaxed 370° C.+ Oil Yield (Wt. % on feed) | 51.0 | 45.0 | 56.0 | 52.0 | 50.0 | 48.0 | 39.0 | 51 |
| 370° C.−,Conversion (wt. % on feed) | 29.0 | 29.0 | 29.0 | 22.0 | 23.8 | 20.7 | 37.3 | 28.7 |

* (a) = continuous pilot unit
  (b) = small lab unit.

EXAMPLE 2

The presence of oil in the wax has been found to produce an enhanced VI product as compared to oil free wax. The amount of oil in the wax, however, must fall within a particular range as previously described, if this enhanced VI phenomenon is to be obtained.

A meshed platinum on fluorided γ alumina catalyst (Catalyst 2) was used to isomerize a slack wax obtained from a 600N oil. The wax samples had oil contents of about 1%, about 7% and about 23%. The wax containing less than about 1% oil was made by recrystallizing a 600N slack wax by warm-up deoiling followed by hydrotreating. This 1% oil wax has 99% saturates, 0.8% aromatics and 0.2% molar compounds (as determined by silica gel separation). It had an initial boiling point of 382° C. and a 99% off boiling point of 588° C., as determined by GCD. Subsequently, isomerized products were dewaxed to between −18 to −21° C. pour doing. Fractionation of the products to produce a dewaxed oil having a viscosity of ~4.7 cSt @100° C. showed that the isomerate made from slack wax possessing about 7% oil exhibited an unexpected VI enhancement as compared to the other slack wax feeds containing <1% and 23% oil. This i t be compared with the results obtained using an extrudate Pt/F Al₂O₃ catalyst made as recited below. Catalyst 6: One sixteenth inch γ alumina extrudate impregnated with platinum were obtained from a commercial supplier containing 0.6 wt. % platinum and 1% chlorine. The metal loaded extrudate was flourided using a solution of NH₄F/HF at pH about 4 by soaking. The soaked material was washed, then dried and heated for 2 hours at 400° C. in air (according to the procedure of copending U.S. Ser. No. 283,709 filed even date herewith which is a continuation-in-part of U.S. Ser. No. 134,795 filed Dec. 18, 1987 in the names of Cody, Sawyer, Hamner and Davis). Fluorine content was found to be 6.9%. The catalyst was activated by heating in 50 psi flowing H₂ as follows: room temperature to 100° C. in 2 hours, hold for 1 hour, 100° C. to 350° C. in 2 hours, hold for 1 hour.

Catalyst 6 was used to isomerize slack waxes containing <1%, 10.9% and 22% oil under conditions selected to achieve the levels of conversion to fuels and lighter products indicated in Table 2. Comparing the results obtained using Catalyst 2 with those obtained using Catalyst 6 one sees that isomerization utilizing the meshed catalyst (Catalyst 2) produces a product which exhibits a VI enhancement when the wax feed employed contains about 7% oil.

From the above it is clear that this sized catalyst (Catalyst 2) is preferred for use in an isomerization processes.

TABLE 2

Example of Unexpected VI Enhancement using Sized Catalyst versus extrudate catalyst on waxes of about 10% oil content

| Catalyst | Wax Feed Oil Content | Conv. to 370° C.− | Vis. @ 100° C. of 370° C.+ oil fraction | VI |
|---|---|---|---|---|
| 2 | <1 | 13 | 4.8 | 148 |
|   | 7 | 24 | 4.8 | 150 |
|   | 23 | 12.8 | 4.8 | 135 |
|   | 23 | 25.8 | 4.8 | 137 |
| 6 | <1 | 19.3 | 4.8 | 147 |
|   | <1 | 35.0 | 4.6 | 142 |
|   | 10.9 | 26.8 | 4.9 | 143 |
|   | 22 | 28.8 | 5.0 | 139 |
|   | 22 | 48.6 | 4.6 | 136 |

What is claimed:

1. A method for producing a catalyst for use in wax isomerization processes, said method comprising the steps of:
   (1) depositing a hydrogenation metal component on a refractory metal oxide particle or extrudate support followed by calcination;
   (2) fluoriding the metal loaded refractory metal oxide support to a level of 2 to 10 wt % F using an acidic fluorine source;
   (3) crushing the fluorided metal loaded refractory metal oxide support to expose inner surfaces thereof, and sizing said crushed fluorided metal loaded refractory metal oxide support to a particle size of 1/32 inch or smaller across the largest continuous cross sectional dimension;
   (4) activating said sized catalyst by heating in a hydrogen atmosphere.

2. A method for producing a catalyst for use in wax isomerization processes, said method comprising the steps of:
   (1) depositing a hydrogenation metal component on a refractory metal oxide particle or extrudate support, followed by calcination;
   (2) crushing the metal loaded support, and sizing said crushed metal loaded support, to a particle size of 1/32 inch or smaller across the longest continuous cross-sectional dimension;
   (3) fluoriding the sized metal loaded support to a level of 2 to 10 wt % F using an acidic fluorine source;
   (4) activating said sized catalyst by heating in a hydrogen atmosphere.

3. The method of claim 1 or 2 wherein the support is sieved to remove particles larger than 1/32 inch across the longest continuous cross-sectional dimension.

4. The method of claim 1 or 2 wherein following sizing and sieving the catalyst possesses a particle size ranging between 1/64 to 1/32 inch across the longest continuous cross-sectional dimension.

5. The method of claim 1 or 2 wherein the hydrogenation metal component is a Group VIII metal or mixture thereof present at 0.1 to 5.0 wt % metal.

6. The method of claim 5 wherein the hydrogenation metal component is a Group VIII metal.

7. The method of claim 6 wherein the hydrogenation metal component is platinum.

8. The method of claim 7 wherein the platinum is present at from 0.2 to 0.6 wt % metal.

9. The method of claim 1 or 2 wherein the refractory metal oxide support is alumina, or alumina containing material.

10. The method of claim 9 wherein the refractory metal oxide support is gamma alumina.

11. The method of claim 1 or 2 wherein fluorine loading is at a level of 2 to 8% fluorine.

12. The method of claim 1 or 2 wherein the acidic fluorine source is a solution of HF.

13. The method of claim 1 or 2 wherein the hydrogen activation is conducted to a temperature of 350° C. to 500° C. for from 1 to 48 hours or longer.

* * * * *